(12) United States Patent
Norton

(10) Patent No.: US 9,853,813 B2
(45) Date of Patent: Dec. 26, 2017

(54) METHOD FOR SECURING A PRIVATE KEY

(71) Applicant: Crater Dog Technologies, LLC, Louisville, CO (US)

(72) Inventor: Derk Norton, Louisville, CO (US)

(73) Assignee: Crater Dog Technologies, LLC, Louisville, CO (US)

( * ) Notice: Subject to any disclaimer, the term of this patent is extended or adjusted under 35 U.S.C. 154(b) by 0 days.

(21) Appl. No.: 15/150,764

(22) Filed: May 10, 2016

(65) Prior Publication Data
US 2017/0272245 A1   Sep. 21, 2017

Related U.S. Application Data

(60) Provisional application No. 62/309,602, filed on Mar. 17, 2016.

(51) Int. Cl.
| | |
|---|---|
| *G06F 21/00* | (2013.01) |
| *H04L 29/06* | (2006.01) |
| *H04L 9/08* | (2006.01) |
| *H04L 9/32* | (2006.01) |

(52) U.S. Cl.
CPC .......... *H04L 9/0894* (2013.01); *H04L 9/0863* (2013.01); *H04L 9/0866* (2013.01); *H04L 9/0897* (2013.01); *H04L 9/3236* (2013.01); *H04L 9/3247* (2013.01); *H04L 2209/24* (2013.01)

(58) Field of Classification Search
CPC ... H04L 9/0894; H04L 9/3247; H04L 9/0897; H04L 9/0866; H04L 9/0863; H04L 9/3236; H04L 2209/24
See application file for complete search history.

(56) References Cited

U.S. PATENT DOCUMENTS

| | | | |
|---|---|---|---|
| 6,950,523 B1 * | 9/2005 | Brickell | H04L 9/3226 380/277 |
| 7,055,039 B2 | 5/2006 | Chavanne et al. | |
| 7,454,782 B2 * | 11/2008 | Rajasekaran | G06F 21/62 713/182 |
| 7,471,792 B2 | 12/2008 | Yamamichi et al. | |
| 8,214,651 B2 | 7/2012 | Anemikos et al. | |
| 8,259,934 B2 | 9/2012 | Karroumi et al. | |
| 8,369,516 B2 | 2/2013 | Itoh et al. | |
| 8,995,652 B1 | 3/2015 | Thompson | |
| 9,483,486 B1 * | 11/2016 | Christiaens | G06F 17/30156 |

(Continued)

*Primary Examiner* — Lisa Lewis
(74) *Attorney, Agent, or Firm* — Sheridan Ross PC

(57) ABSTRACT

Systems and methods are provided for securing a private key on a mobile device for use with public key cryptography. Specifically, a private key is reduced to two partial keys where the partial keys are stored on separate electronic devices. The partial keys combine to temporarily regenerate the private key for the purposes of notarizing (digitally signing) messages or documents, and decrypting a message or document that was encrypted using the corresponding public key. The partial keys in some embodiments may be a secret key, which can be derived from an account identifier and a password, and an exclusive key, which can be derived from the secret key and the private key. The private key can be regenerated from the secret key and the exclusive key. With the partial keys stored on separate devices, another layer of practical security is provided to public key cryptography.

26 Claims, 11 Drawing Sheets

(56) References Cited

U.S. PATENT DOCUMENTS

| | | | |
|---|---|---|---|
| 2003/0204732 A1* | 10/2003 | Audebert | H04L 63/0846 713/182 |
| 2005/0063548 A1* | 3/2005 | Antipa | H04L 9/3281 380/285 |
| 2006/0210082 A1* | 9/2006 | Devadas | G06F 21/31 380/277 |
| 2008/0137857 A1* | 6/2008 | Bellare | H04L 9/085 380/255 |
| 2009/0006921 A1* | 1/2009 | Engberg | H03M 13/093 714/752 |
| 2011/0004557 A1* | 1/2011 | Wang | G06Q 20/00 705/67 |
| 2011/0131639 A1 | 6/2011 | Buhler et al. | |
| 2014/0185805 A1* | 7/2014 | Andersen | H04W 12/02 380/270 |
| 2014/0298006 A1 | 10/2014 | Shaik et al. | |
| 2015/0046695 A1* | 2/2015 | Philipsz | H04L 63/0853 713/155 |
| 2015/0117645 A1* | 4/2015 | Carlson | H04L 63/0435 380/262 |
| 2015/0149771 A1 | 5/2015 | Yen et al. | |
| 2015/0312260 A1* | 10/2015 | Kim | H04L 51/32 713/152 |
| 2016/0278067 A1* | 9/2016 | Badam | G06F 3/0619 |
| 2017/0012949 A1* | 1/2017 | Boren | H04L 63/0435 |

\* cited by examiner

METHOD FOR SECURING A PRIVATE KEY

CROSS REFERENCE TO RELATED APPLICATIONS

This application claims the benefit of U.S. Provisional Patent Application Ser. No. 62/309,602, filed Mar. 17, 2016, the entire disclosure of which is hereby incorporated herein by reference.

FIELD

The invention relates to public key cryptography and the ephemeral regeneration of a private key from multiple, physically separated, partial keys to notarize (i.e. digitally sign), encrypt, or decrypt a message and improve the security of public key cryptography.

BACKGROUND

Public key cryptography is a type of cryptography that utilizes two keys to notarize a message with a digital signature or encrypt or decrypt a message. The first key is a public key that is associated with a known party, and the public key is available to the public or otherwise available to relevant parties in a given transaction. The second key is a private key that is kept secret by the known party. These two keys are mathematically linked to each other such that it is relatively easy to calculate the public key from the private key but nearly impossible to calculate the private key from the public key. Therefore, for example, a party that receives a message digitally signed with a private key can verify the digital signature with the related public key. However, it is impractical to mathematically derive the private key from the public key and then "forge" digital signatures on data or messages using the private key. Early examples of public key crypto-systems include RSA and Diffie-Hellman.

While it may be nearly impossible to mathematically calculate a private key from a public key, public key cryptography is still susceptible to non-mathematical security issues, for example, conventional theft of the private key. Thus, the security of public key cryptography hinges on the ability of the party to keep the private key secret and confidential. Physical theft of a notebook computer or other electronic device, hacking into an email account, malware, etc. are all security issues that routinely occur and compromise public key cryptography. Therefore, there is a need to provide better security for the private key in public key cryptography where the theft of a device or the compromise of a device will not allow the thief to possess the private key and compromise the public key cryptography.

SUMMARY

Embodiments of the invention promote the security of a private key by reducing the private key into multiple partial keys, which are stored on physically separate electronic devices. Therefore, if one electronic device is stolen or compromised, then the partial key on that device cannot be used to forge a digital signature on a message, a document, or data. Instead, the multiple partial keys are assembled to temporarily regenerate the private key only with explicit authorization from the owner. After using the regenerated private key to notarize, encrypt, or decrypt a message, the regenerated private key is deleted, and once again, only partial keys exist on the physically separate devices.

In accordance with embodiments of the present invention, a cryptographic hash function HASH is used to generate a fixed length bit string from any data string, like an account identifier or an account password. A cryptographic hash function can be chosen that generates a bit string with the same number of bits as a private key. Also in accordance with embodiments of the present invention, the exclusive disjunction function, commonly referred to as "exclusive-or" or XOR, is utilized to construct a key from two partial keys. Each key is a bit string of the same length as the output of the cryptographic hash function. The exclusive-or function is a boolean function that operates on each pair of bits in the input strings and outputs a 1 bit only when the corresponding bits in each input differ. For example: 1001 XOR 1100 yields 0101. Using the cryptographic hash function and the exclusive-or function a secret key S with the same number of bits as the private key k may be generated from a login account identifier A and an account password P as follows: S=XOR(HASH(A), HASH(P)). Then an exclusive key X can be generated from the secret key S and the private key k using the exclusive-or function as follows: X=XOR(S, k). As a result, the secret key and the exclusive key are partial keys, and the exclusive-or of the secret key and the exclusive key reproduces the private key as follows: k=XOR(X, S).

The partial keys should be stored on physically separate devices to improve the security of public key cryptography. In some embodiments, the secret key may be stored on a mobile device such as a smart phone, a tablet computer, or a notebook computer; and the exclusive key may be stored on a wearable device such as a ring, a watch, a necklace, a bracelet, or any other similar type of article that is distinct from the mobile device. The user logs into the mobile device, which stores the secret key, and the user wears the wearable device, which stores the exclusive key. Generally, when the user wishes to notarize, encrypt, or decrypt a message, the mobile device sends the secret key to the wearable device. Then, the wearable device regenerates the private key by taking the exclusive-or of the secret key and the exclusive key, which is stored on the wearable device. The mobile user can then be prompted by the wearable device to press a button on the wearable device or otherwise authorize the wearable device to use the regenerated private key for the intended purpose. After serving its purpose, the wearable device deletes the regenerated private key and the secret key and retains the exclusive key. Therefore, if the mobile device or the wearable device is stolen, it is impossible to regenerate the private key and forge a digital signature using that private key.

The combination of the mobile device and the wearable device that receives authorization input from a mobile user can be used to perform various operations in the present invention. For instance, the mobile user may press and hold a button on the wearable device to authorize the pairing of the wearable device and the mobile device. Once paired, the mobile user may press the button on the wearable device to notarize a message, encrypt a message, or decrypt a message. The notarized and/or encrypted message can then be used to log the mobile user into his or her mobile device, computer, or a remote web site, send a digital payment to a merchant, digitally sign (notarize) a legal contract, and many other nonrepudiateable transactions. Further, the mobile user can use the button on the wearable device to authorize the resetting of a password on the mobile device or the rotation of the private and public keys to maintain the integrity of the public key cryptography system.

It will be appreciated that embodiments of the present invention may extend beyond the wearable device and the mobile device described herein. For example, physically separate servers may store partial keys to guard against the theft or compromise of one of the servers. The servers may combine the partial keys to temporarily regenerate a private key for various public key cryptography purposes. Thus, the wearable device and the mobile device may generally refer to a first electronic device and a second electronic device. Further still, embodiments of the present invention may be performed on a single electronic device. In this sense, physically separate means that the partial keys are stored, for example, on different hard drives or storage devices, or different portions of the same hard drive or storage device such that the partial keys are compartmentalized. Thus, the security compromise of one partial key does not affect the security of the other partial key, and the private key can be temporarily regenerated from the partial keys.

Additional features and advantages of embodiments of the present disclosure will become more readily apparent from the following description, particularly when taken together with the accompanying drawings.

DETAILED DESCRIPTION

Figure 1:
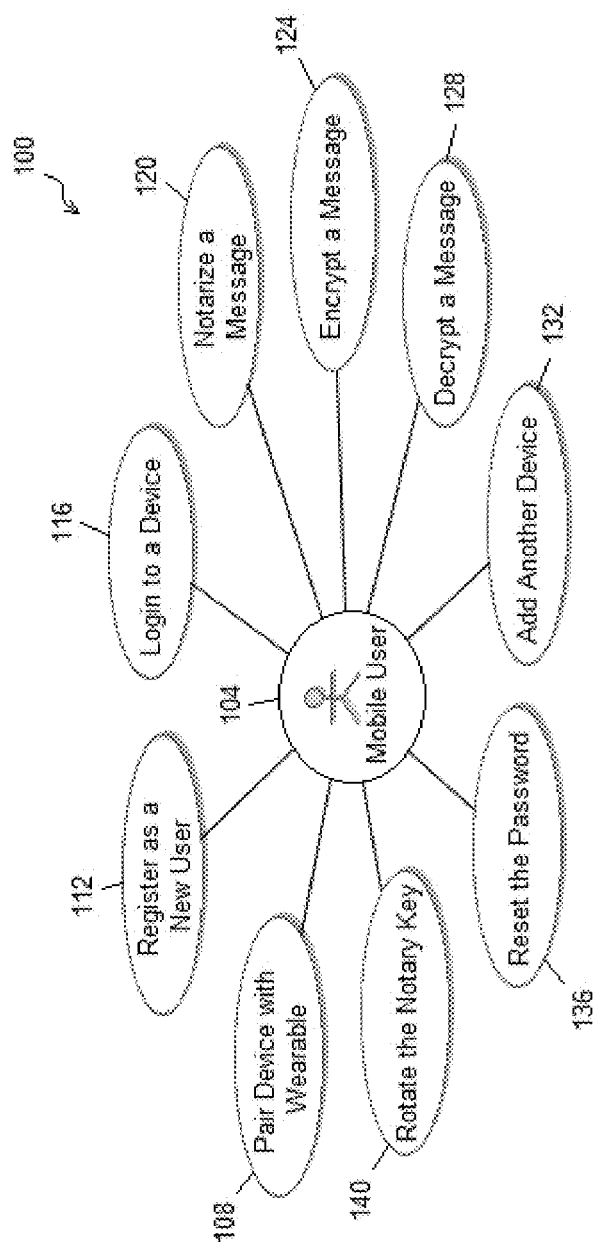
FIG. 1 is a use case diagram of a system for regenerating a private key that depicts the various operations of the system in accordance with embodiments of the invention.

FIG. 1 depicts a system 100 for regenerating a private key for public key cryptography using two partial keys stored on physically separate devices. The diagram illustrates how a mobile user 104 can set up the system 100, utilize the system 100 for encryption and decryption, and perform other various functions with a regenerated private key. The mobile user 104 can set up the system 100 by pairing 108 a mobile device and a wearable device, registering 112 as a new user, and then logging 116 into the mobile device. Once set up is complete, the mobile user 104 can utilize the system 100 to digitally sign or notarize 120 messages with a regenerated private key, encrypt 124 messages to another mobile user or system using the other user or system's public key, and decrypt 128 messages using the regenerated private key. The mobile user 104 can also perform functions such as adding 132 another mobile device that operates with the wearable device, resetting 136 the password to the mobile device, and rotating 140 the private key to maintain the security of public key cryptography. Embodiments of the present invention are depicted as having two electronic devices that regenerate a private key from two partial keys where one partial key is stored on the first electronic device and another partial key is stored on the second electronic device. However, it will be appreciated that embodiments of the present invention may include only one electronic device that can store the partial keys in physically separate locations or more than two electronic devices.

Figure 2:
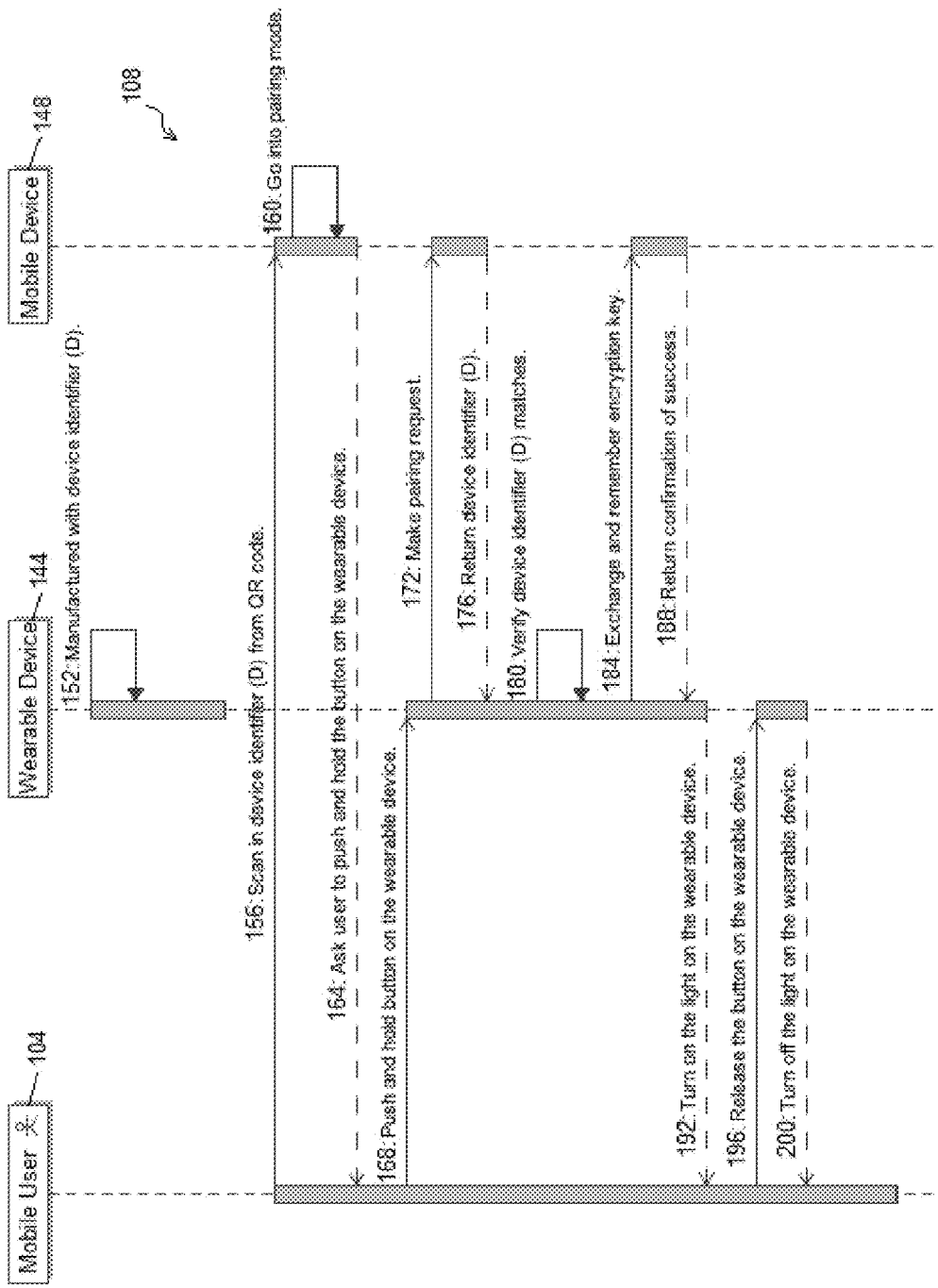
FIG. 2 is a sequence diagram that depicts pairing a mobile electronic device and a wearable electronic device in accordance with embodiments of the invention.

FIG. 2 depicts a sequence for pairing 108 a mobile device 148 with a wearable device 144 so that the devices 144, 148 may operate together to digitally sign messages or decrypt messages using a regenerated private key. Generally, the mobile user 104 will log into the mobile device 148, and then provide an identifier for the wearable device 144 to the mobile device 148 to initiate the pairing 108. To prompt the mobile user 104 for his or her authorization of the pairing 108, the wearable device 144 may emit a light or sound or produce haptic feedback. The wearable device 144 may also have features to receive an input from the mobile user 104 including, but not limited to, a button, an accelerometer, a voice recognition system, a fingerprint scanner, a keypad, a touch screen, etc. Thus, a wearable device 144 may flash a light to indicate to the next step in a sequence is ready to be performed, and the mobile user 104 may press a button on the wearable device 144 to authorize the next step in the sequence. The wearable device 144 may be a ring, bracelet, necklace, or other articles of clothing that people commonly wear, or even a human implantable device in some embodiments.

In the depicted sequence 108, the wearable device 144 is manufactured 152 with a unique device identifier D, which could be a bit string, a QR code, a barcode, etc. The mobile user 104 enters 156 the device identifier D into the mobile device 148, and the mobile device 148 enters 160 into a pairing mode. In this mode, the mobile device 148 requests 164 that the mobile user 104 enter an input into the wearable device 144 to initiate a pairing request with the mobile device 148. As noted above, the wearable device 144 may have a button, and the mobile user 104 satisfies the request 164 by pressing and holding 168 the button on the wearable device 144.

While the mobile user 104 holds the button, the wearable device 144 sends 172 a pairing request to the mobile device 148, and the mobile device 148 returns 176 the device identifier D to the wearable device 144. Then, the wearable device 144 verifies 180 that the device identifier D received from the mobile device 148 matches the device identifier D of the wearable device 144. Next, the wearable device 144 exchanges 184 an encryption key with the mobile device 148 to secure future communication between the two devices 144, 148, and the mobile device 148 returns 188 a confirmation of the encryption key exchange with the wearable device 144. The encryption key can be used to establish a secure communication protocol between the devices 144, 148, including, but not limited to, Bluetooth 4, and near field communications (NFC) with transport layer security (TLS) 1.2 or greater.

The wearable device 144 sends 192 an indication of a successful pairing of the devices 144, 148, which could be a light, flashing or otherwise, on an exterior of the wearable device 144. The mobile user 104 then releases 196 the button, and the wearable device 144 turns 200 off the light. With the devices 144, 148 successfully paired, the devices 144, 148 may securely exchanged information to perform the functions described herein.

The pairing 108 of the devices 144, 148 through a wireless communication protocol adds to the security function of public key cryptography because there is a maximum operational distance between the devices 144, 148. The maximum range for some low energy Bluetooth devices is approximately 50 meters. Thus, if one of the devices 144, 148 is stolen and transported a greater distance than the maximum operational range of the wireless communication protocol between the devices 144, 148, then it is impossible to regenerate the private key to forge digital signatures, etc.

Figure 3:
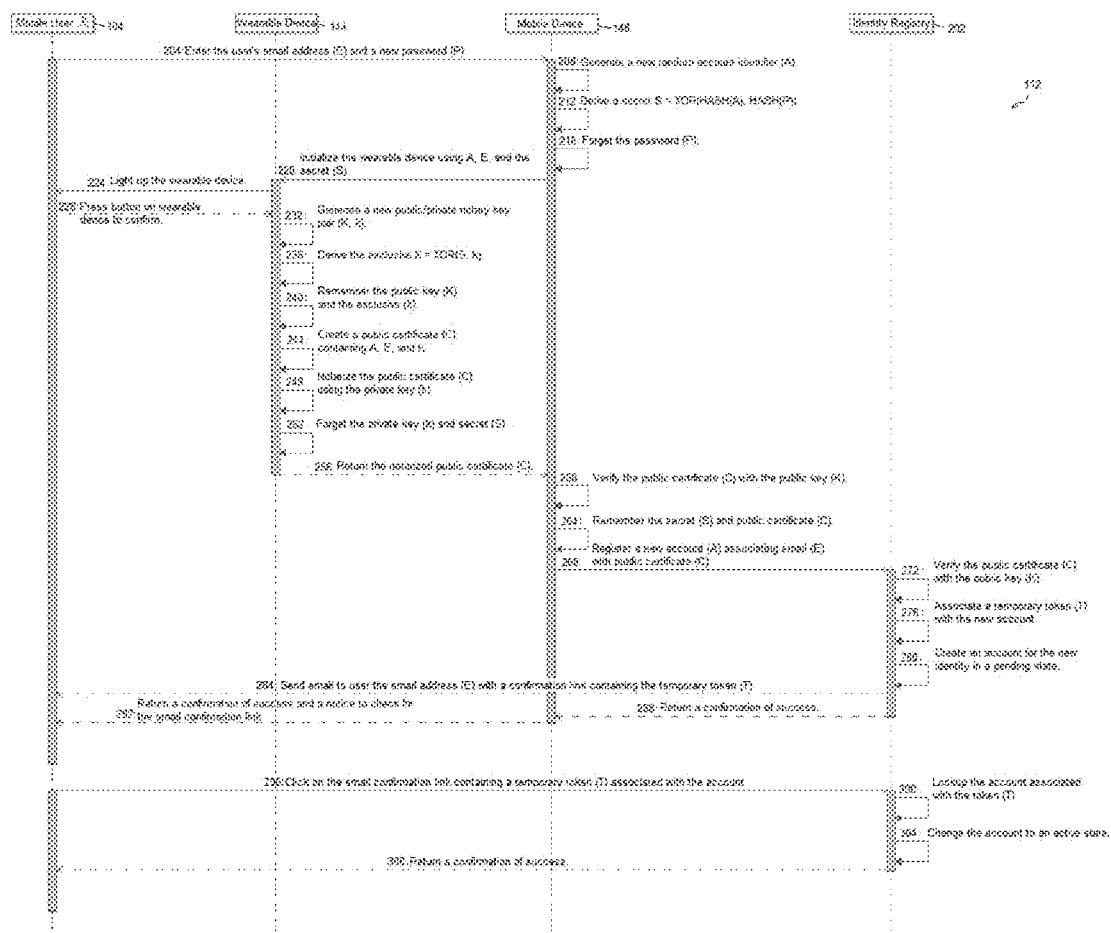
FIG. 3 is a sequence diagram that depicts registering a new account for a mobile user in accordance with embodiments of the invention.

FIG. 3 shows a sequence for registering 112 a new mobile user 104 to establish a new mobile user account associated with a new public-private key pair and to store the account information including the public key in an identity registry 202. First, the public-private key pair is established. In the depicted embodiment, the mobile user 104 enters 204 an email address E and a new password P into the mobile device 148, which generates 208 a new random account identifier A for the mobile user 104. Next, the mobile device 148 derives 212 a secret key S=XOR(HASH(A), HASH(P)) using a cryptographic hash function and a bit-wise exclusive-or function. A cryptographic hash function HASH is a function that maps data of an arbitrary size, for example, an arbitrarily long account identifier A or password P, to a fixed size crypto-random bit string. The bit-wise exclusive-or function XOR is a boolean function that operates on each pair of bits in the input strings and outputs a 1 bit only when the corresponding bits in each input differ and a 0 bit otherwise. For example: 1001 XOR 1100 yields 0101. Therefore, when the hash of the account identifier A and the hash of the password P are the same size, then the result of the exclusive-or of the two hashes, the secret key S, is also the same size.

In addition, it will be appreciated that the exclusive-or of the hash of the account identifier A and the hash of the password P may be, in some embodiments, any one of many approaches, including (1) an exclusive-or of the concatenation of the account identifier and the password P, (2) an exclusive-or of the concatenation of the email address E, the password P and a random salt value R, or (3) an exclusive-or of the password based encryption of the email address E. It will be further appreciated that these operations and other operations described herein may be commutative.

Referring again to FIG. 3, after deriving the secret key S, the mobile device 148 forgets or deletes 216 the password P from a non-transitory computer-readable storage medium on the mobile device 148. Examples of non-transitory computer-readable storage mediums may include volatile memory such as random access memory and non-volatile memory such as solid state drives or hard disk drives. Both devices 144, 148 may have non-transitory computer-readable storage media to store and delete various keys and data as necessary. Next, the mobile device 148 initializes 220 the wearable device 144 by sending the wearable device 144 the account identifier A, the email address E, and the secret key S. The wearable device 144 turns on 224 a light, and the mobile user 104 authorizes 228 the initialization by pressing a button on the wearable device 144 which turns off the light on the wearable device 144. Then, the wearable device 144 generates 232 a new private key k and corresponding public key K that can be used to verify data or messages that have been notarized, or digitally signed using the private key k. The wearable device 144 derives 236 an exclusive key X=XOR(S, k) which is a partial key like the secret key S. From now on the private key k can be regenerated using the exclusive-or function with k=XOR(X, S). The wearable device 144 then stores 240 the public key K and the exclusive key X, on a non-transitory computer-readable storage medium.

Next, the wearable device 144 creates 244 a public certificate C containing the account identifier A, the email address E, and the public key K. The wearable device 144 notarizes 248 the public certificate C using the private key k to add a notary seal which contains the digital signature of the contents of the public certificate C. The digital signature can be verified by any party using the public key K that is now contained in the public certificate C. Thus, the notary seal allows message sender authentication and non-repudiation. The wearable device 144 forgets or deletes 252 the private key k and the secret key S from a non-transitory computer-readable storage medium. The wearable device 144 returns 256 the notarized public certificate C to the mobile device 148 where the mobile device 148 verifies 260 the notary seal on the public certificate C using the public key K. If the notary seal is valid the mobile device 148 stores 264 the secret key S and the public certificate C in a non-transitory computer-readable storage medium.

Now that the wearable device 144 has notarized the public certificate C, the mobile device 148 registers 268 a new account A with the identity registry 202, and the new account A is associated with the mobile user's email address E and the notarized public certificate C. The identity registry 202 verifies 272 the notary seal of the public certificate C with the public key K. The identity registry 202 then associates 276 the new account with a temporary unique token T, and the identity registry 202 creates 280 the new account with a pending status.

To change the account status to active, the mobile user 104 must confirm his or her identity with the identity registry 202. The identity registry 202 sends 284 a confirmation to the mobile user 104, which may be an email with a confirmation link. The identity registry 202 also sends 288 a confirmation that the new account A was created to the mobile device 148. In turn, the mobile device 148 returns 292 a confirmation to the mobile user 104 to check for the email confirmation link. The mobile user 104 selects 296 the email confirmation link, which contains the unique token T associated with the new account. The identity registry 202 receives the message containing the unique token T and retrieves 300 the account associated with the unique token T, and the identity registry 202 changes 304 the status of the account from pending to active. Lastly, the identity registry 202 returns 308 a confirmation of success to the mobile user 104.

Figure 4:
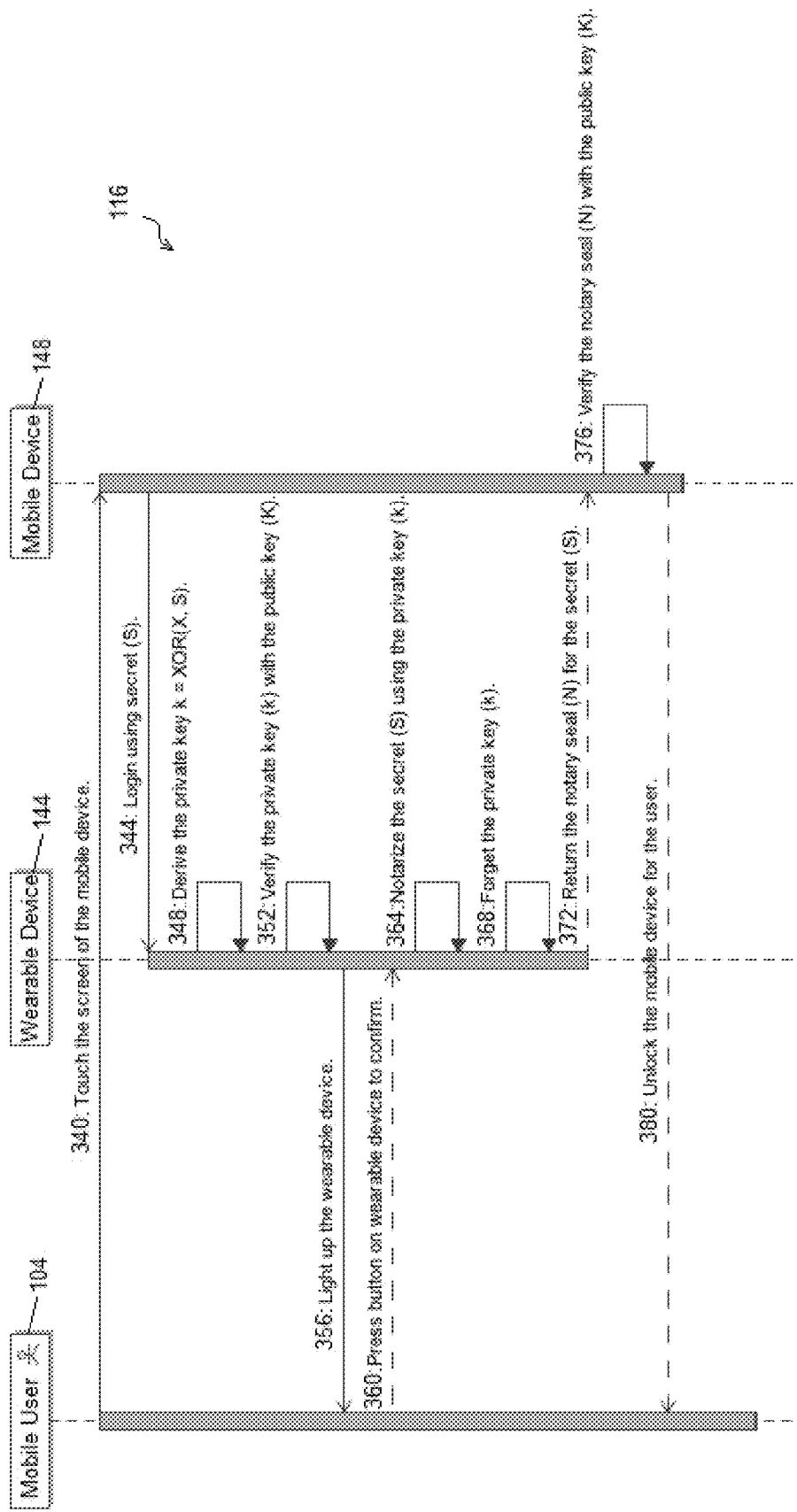
FIG. 4 is a sequence diagram that depicts logging into a mobile device to use the mobile device in combination with the wearable device in accordance with embodiments of the invention.

FIG. 4 depicts a sequence allowing the mobile user 104 to login 116 to the mobile device 148 by using the combination of the mobile device 148 and the wearable device 144 to create a login notary seal containing an unforgeable digital signature. To begin, the mobile user 104 wakes up 340 the mobile device 148 by, for example, pressing a touch screen on the mobile device 148, or opening the cover on the mobile device 148. The mobile device 148 initiates 344 the login sequence by passing the secret key S to the wearable device 144. The wearable device 144 regenerates 348 the private key k by taking the exclusive-or of the exclusive key X (stored on the wearable device 144) and the secret key S (supplied by the mobile device 148) as k=XOR(X, S). The wearable device 144 then verifies 352 the regenerated private key k with the public key K. The wearable device 144 turns on 356 a light, and the mobile user 104 confirms 360 that the mobile user 104 wants to login by pressing a button on the wearable device 144 which turns off the light on the wearable device 144. It will be appreciated that in some embodiments, a bit-wise exclusive-or function XOR may instead be any one of an advanced encryption standard, a blowfish cipher, a triple DES cipher, and a XOR cipher.

After authorization from the mobile user 104, the wearable device 144 notarizes 364 the secret key S using the regenerated private key k to create a notary seal N. Then, the wearable device 144 forgets or deletes 368 the regenerated private key k from a non-transitory computer-readable storage medium. The wearable device 144 sends 372 the notary seal N to the mobile device 148. The mobile device 148 verifies 376, using the public key K (contained in the public certificate C stored on the mobile device 148), that the notary seal N corresponds to the secret key S (also stored on the mobile device 148) and, if so, the mobile device 148 unlocks 380 for the mobile user 104.

Figure 5:
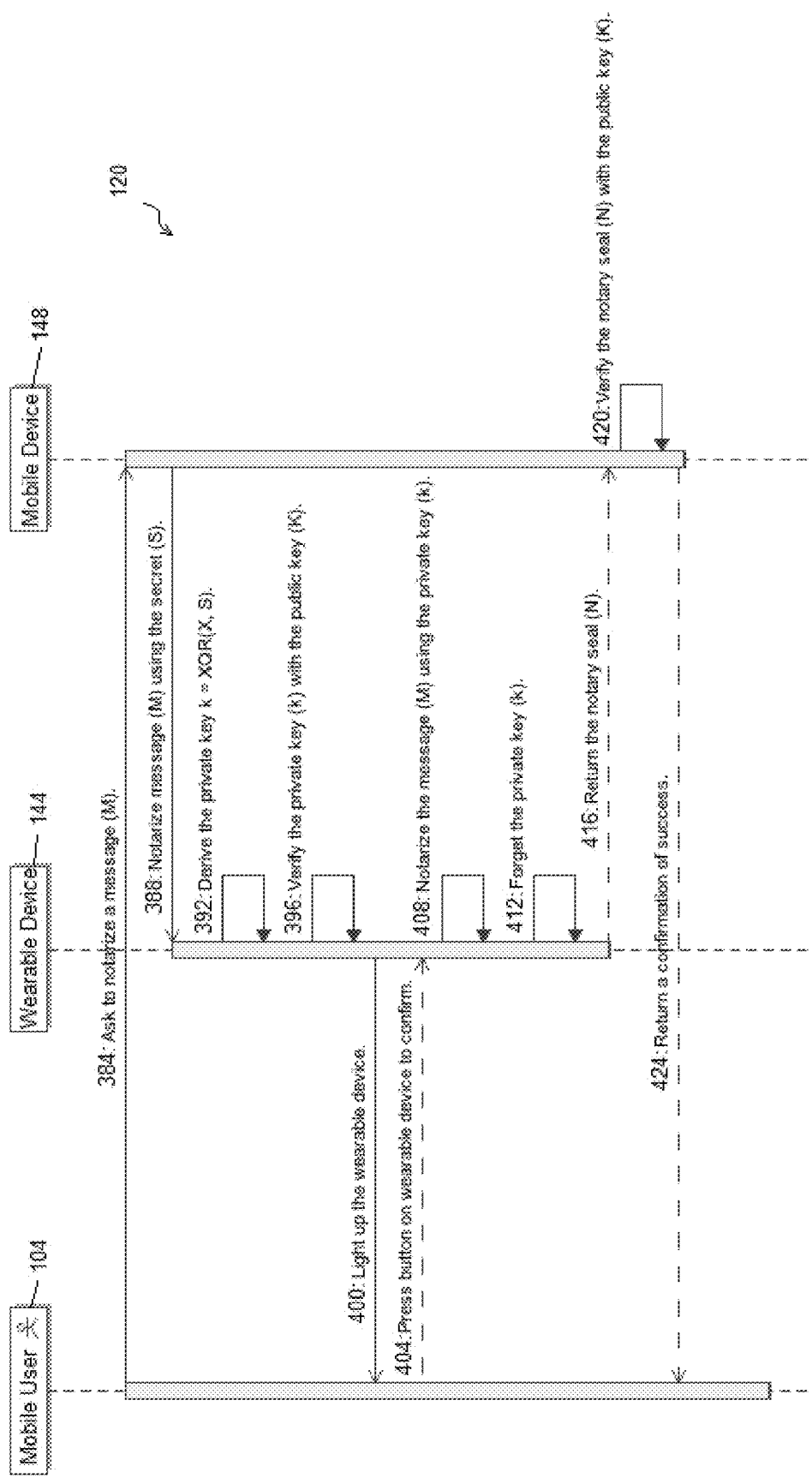
FIG. 5 is a sequence diagram that depicts notarizing a message with a regenerated private key in accordance with embodiments of the invention.

Once logged into the mobile device 148, the mobile user 104 can perform a variety of cryptographic functions using the wearable device 144 to regenerate the private key. FIG. 5 depicts a sequence for notarizing 120 a message or electronic document with a digital signature using a regenerated private key. The mobile user 104 requests 384 the mobile device 148 notarize a message M. The mobile device 148 sends 388 the message M with the secret key S to the wearable device 144. The wearable device 144 regenerates 392 the private key k by taking the exclusive-or of the exclusive key X (stored on the wearable device 144) and the secret key S (supplied by the mobile device 148) as k=XOR (X, S). The wearable device 144 turns on 400 a light, and the mobile user 104 authorizes 404 the notarization by pressing a button on the wearable device 144 which turns off the light on the wearable device 144.

Next, the wearable device 144 notarizes 408 the message M using the regenerated private key k to create a notary seal N, and the wearable device 144 forgets or deletes 412 the regenerated private key k from a non-transitory computer-readable storage medium. The wearable device 144 returns 416 the notary seal N to the mobile device 148, and the mobile device 148 verifies 420, using the public key K (contained in the public certificate C stored on the mobile device 148), that the notary seal N corresponds to the message M. After verification, the mobile device 148 returns 424 a confirmation of success to the mobile user 104. This indicates that the message M has been successfully notarized, and any party with the public key K can verify the notary seal N of the message M to confirm that the mobile user 104 notarized the message M using the private key k.

Figure 6:
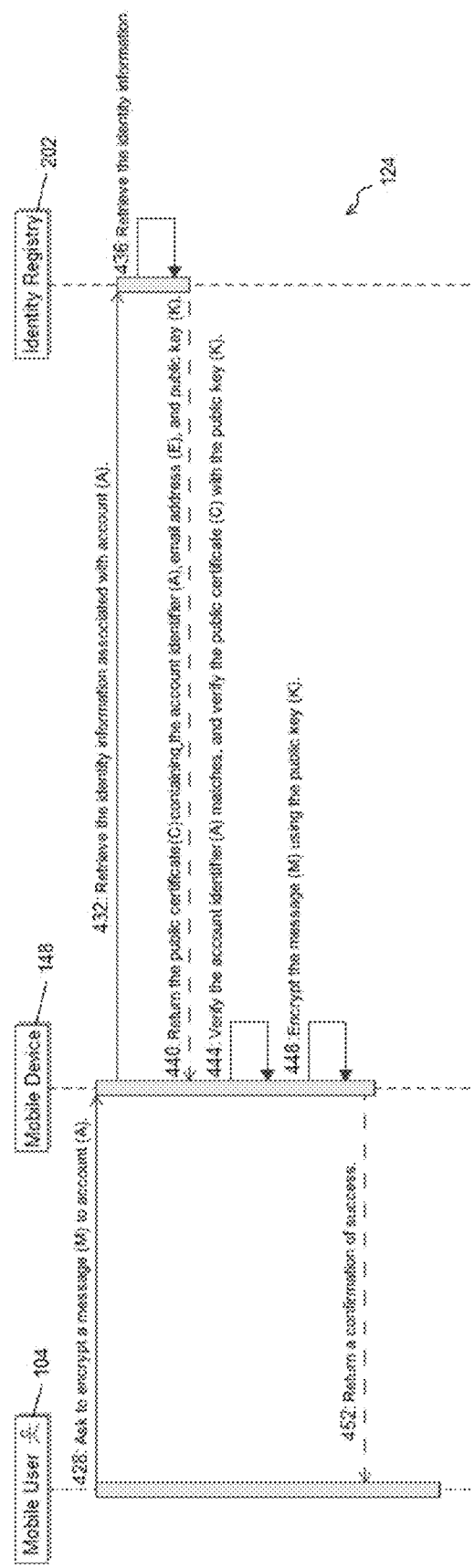
FIG. 6 is a sequence diagram that depicts encrypting a message with a public key in accordance with embodiments of the invention.

FIG. 6 depicts a sequence for encrypting 124 a message that is to be sent to another mobile user or remote system, using the public key K of the other mobile user or remote system. First, the mobile user 104 requests 428 that the mobile device 148 encrypt a message M for account A. In turn, the mobile device 148 requests 432 from the identity registry 202 the identity information contained in a public certificate C associated with account A. The identity registry 202 retrieves 436 the requested information, and the identity registry 202 returns 440 the public certificate C to the mobile device 148. As explained elsewhere herein, the public certificate C contains the account identifier A, the email address E associated with the account, the public key K associated with the private key k that was used to notarize the public certificate C for the account. The mobile device 148 verifies 444 the public certificate C using the public key K and that the account identifier contained in the public certificate C matches the account identifier A requested. Then, the mobile device 148 encrypts 448 the message M with the public key K and returns 452 a confirmation of success to the mobile user 104. Now the encrypted message M can only be decrypted by the owner of the account A using the private key k associated with account A.

Figure 7:
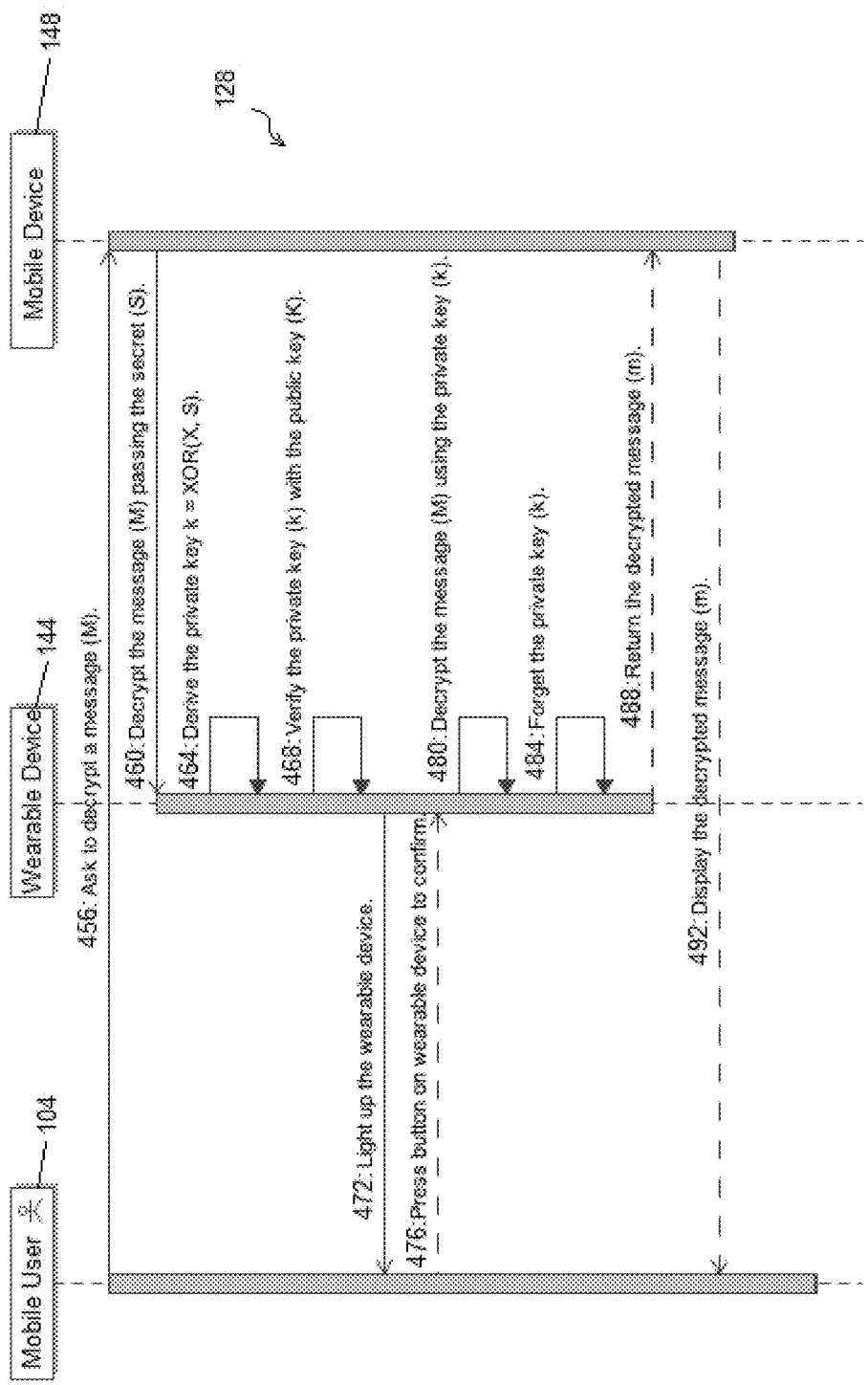
FIG. 7 is a sequence diagram that depicts decrypting a message with a regenerated private key in accordance with embodiments of the invention.

FIG. 7 depicts a sequence for decrypting 128, using a regenerated private key, an encrypted message M that was received from another mobile user or remote system. Other parties can encrypt a message m prior to sending it to the mobile user 104 using the public key K contained in the public certificate C that is available from the identity registry 202 as previously described. First, the mobile user 104 requests 456 that the mobile device 148 decrypt a message M, and the mobile device 148 sends 460 the message M with the secret key S to the wearable device 144. The wearable device 144 regenerates 464 the private key k by taking the exclusive-or of the exclusive key X (stored on the wearable device 144) and the secret key S (supplied by the mobile device 148) as k=XOR(X, S). Then, the wearable device 144 verifies 468 the regenerated private key k using the public key K. The wearable device 144 turns on 472 a light, and the mobile user 104 authorizes 476 the encryption by pressing a button on the wearable device 144 which turns off the light on the wearable device 144.

With the authorization from the mobile user 104, the wearable device 144 decrypts 480 the message M using the regenerated private key k. Then, the wearable device 144 forgets 484 or deletes the regenerated private key k from a non-transitory computer-readable storage medium. The wearable device 144 returns 488 the decrypted message m to the mobile device 148, and the mobile device 148 sends 492 a confirmation of success to the mobile user 104, which in this embodiment may be the display of the unencrypted message m on a display unit of the mobile device 148.

Figure 8:
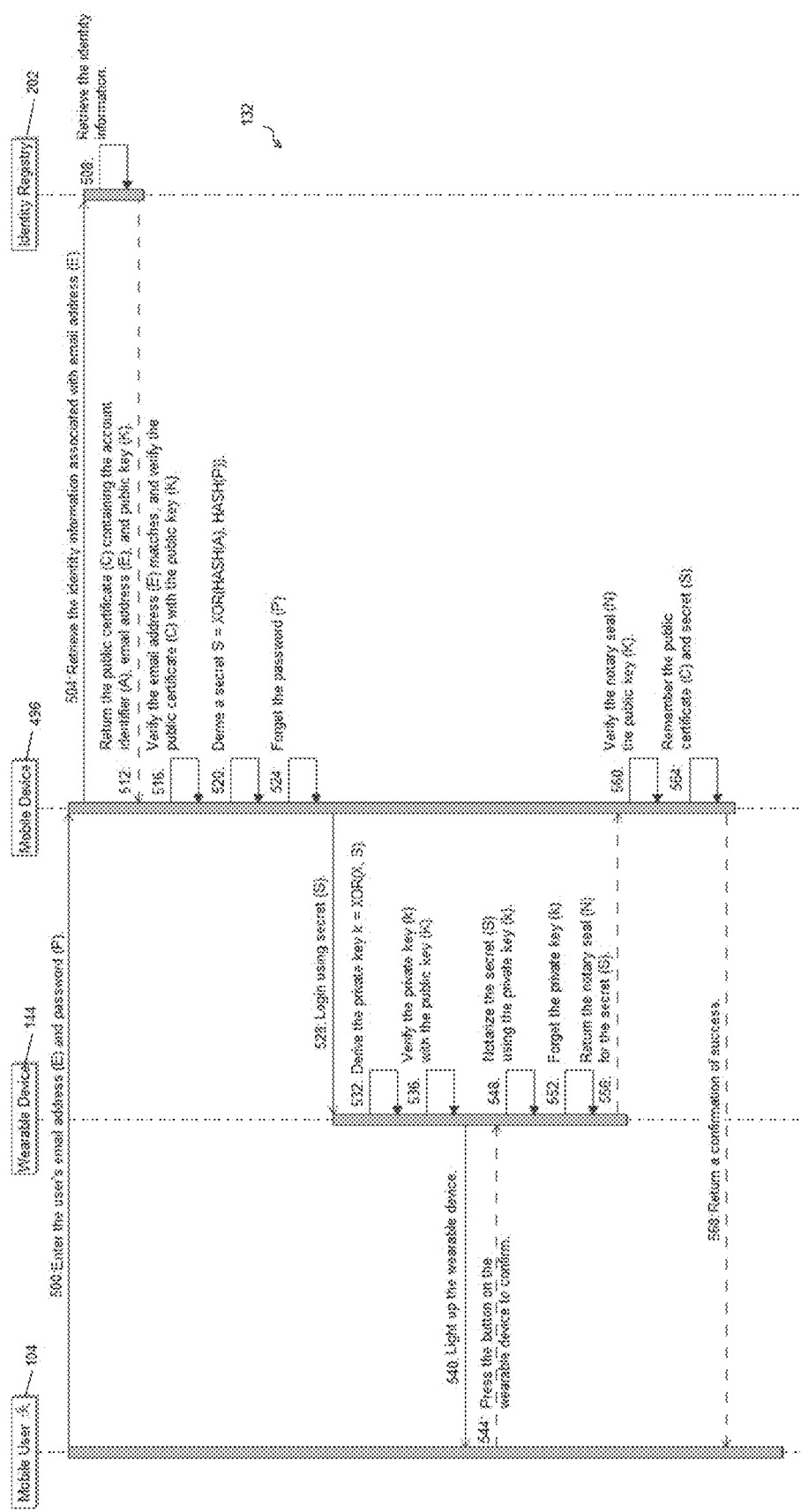
FIG. 8 is a sequence diagram that depicts adding another mobile device that operates in combination with the wearable device in accordance with embodiments of the invention.

FIG. 8 depicts a sequence for adding 132 a new mobile device 496 that uses the existing wearable device 144 to regenerate a private key. First, the mobile user 104 enters 500 into the new mobile device 496 the email address E and password P associated with the existing account identifier A for the mobile user 104. The new mobile device 496 requests 504 the identity information associated with the email address E from the identity registry 202, which in turn, retrieves 508 the identity information. The identity registry 202 then returns 512 the public certificate C containing the identity information to the new mobile device 496. The new mobile device 496 verifies 516 the public certificate C using the public key K contained in the public certificate C, and that the email address contained in the public certificate C matches the email address E requested by the mobile user 104. If the public certificate C and email address E are valid, the new mobile device 496 derives 520 the secret key S using the account identifier A and the password P as S=XOR (HASH(A), HASH(P)), described previously, and the new mobile device 496 forgets or deletes 524 the password P from a non-transitory computer-readable storage medium.

Now that the new mobile device 496 has the secret key S, the new mobile device 496 sends 528 the secret key S to the wearable device 144, and the wearable device 144 regenerates 532 the private key k by taking the exclusive-or of the exclusive key X (stored on the wearable device 144) and the secret key S (supplied by the new mobile device 496) as k=XOR(X, S). The wearable device 144 then verifies 536 the private key k using the public key K. The wearable device 144 turns on 540 a light, and the mobile user 104 authorizes 544 the addition on the new mobile device by pressing a button on the wearable device 144 which turns off the light on the wearable device 144. With authorization from the mobile user 104, the wearable device 144 notarizes 548 the secret key S using the regenerated private key k to create a notary seal N. Then, the wearable device 144 forgets or deletes 552 the regenerated private key k from a non-transitory computer-readable storage medium.

The wearable device 144 returns 556 the notary seal N for the secret key S to the new mobile device 496. The new mobile device 496 verifies 560 the notary seal N using the secret key S and the public key K, and the new mobile device 496 remembers or stores 564 the public certificate C and the secret key S on a non-transitory computer-readable storage medium. Then, the new mobile device 496 sends 568 a confirmation of success to the mobile user 104, indicating that the new mobile device 496 can now operate with the wearable device 144 to notarize, encrypt and decrypt messages or data.

Figure 9:
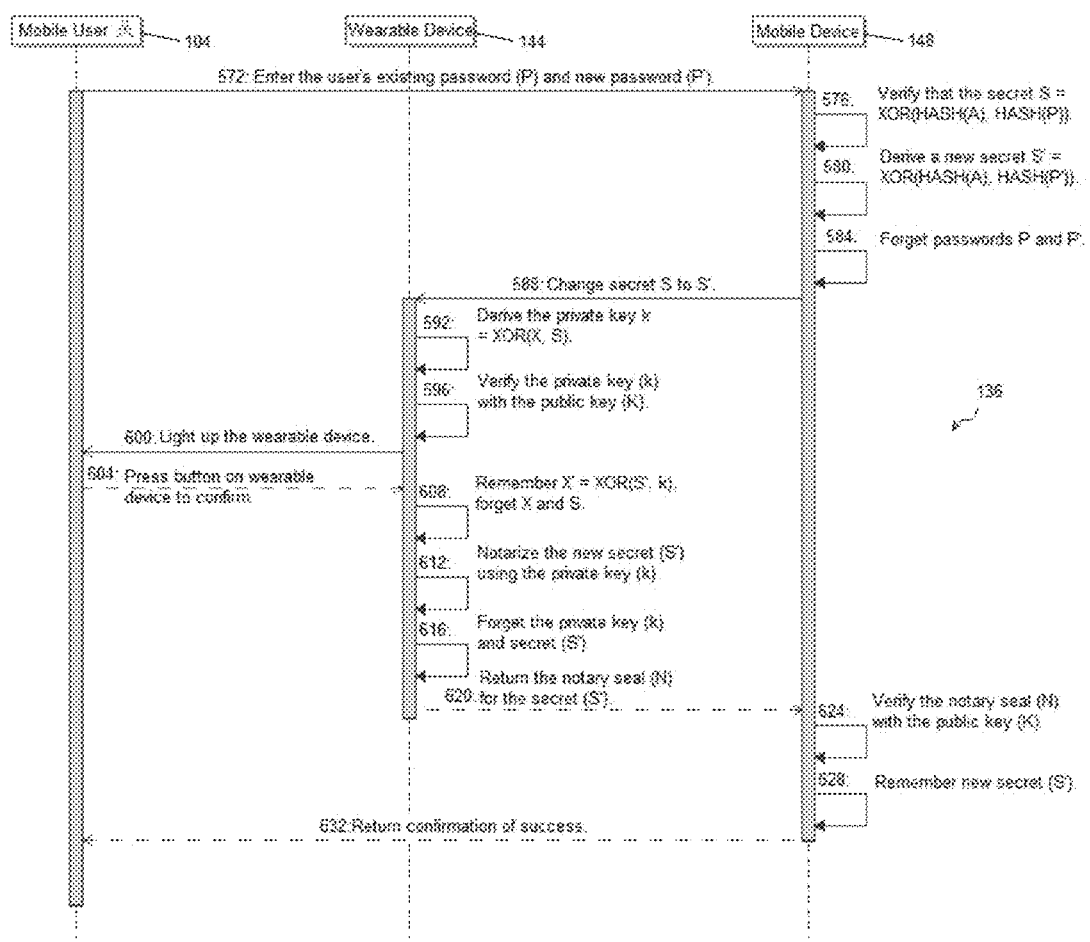
FIG. 9 is a sequence diagram that depicts resetting a password for the mobile device in accordance with embodiments of the invention.

FIG. 9 depicts a sequence for resetting 136 the password for the mobile device 148. The mobile user 104 enters 572 the existing password P and a new password P' into the mobile device 148. First, the mobile device 148 verifies 576 the existing password P by comparing the secret key S to XOR(HASH(A), HASH(P)), where the account identifier A is contained in the public certificate C that is stored by the mobile device 148. If the secret key S matches, the mobile device 148 derives 580 a new secret key S'=XOR(HASH(A), HASH(P')) using the new password P'. Afterwards, the mobile device forgets or deletes 584 the old password P and the new password P' from a non-transitory computer-readable storage medium.

The mobile device 148 sends 588 the new secret key S' to the wearable device 144 to replace the existing secret key S. The wearable device 144 regenerates 592 the private key k by taking the exclusive-or of the existing exclusive key X (stored on the wearable device 144) and the existing secret key S (supplied by the new mobile device 496) as k=XOR(X, S), and then verifies 596 the regenerated private key k using the public key K. The wearable device 144 turns on 600 a light, and the mobile user 104 authorizes 604 the password change by pressing a button on the wearable device 144 which turns off the light on the wearable device 144. The wearable device 144 derives 608 a new exclusive key X'=XOR(S', k) and stores the new exclusive key X' in a non-transitory computer-readable storage medium. The wearable device 114 then forgets or deletes the old exclusive key X and the old secret key S from a non-transitory computer-readable storage medium.

The wearable device 144 notarizes 612 the new secret key S' using the regenerated private key k to create a notary seal N, and then forgets or deletes 616 the regenerated private key k and the new secret key S' from a non-transitory computer-readable storage medium. Then the wearable device 144 returns 620 the notary seal N for the new secret key S' to the mobile device 148. The mobile device 148 verifies 624 the notary seal N using the public key K. Then, the mobile device 148 remembers or stores 628 the new secret key S' on a non-transitory computer-readable storage medium, and the mobile device 148 sends 632 a confirmation of success to the mobile user 104, indicating that the password has been reset.

Figure 10:
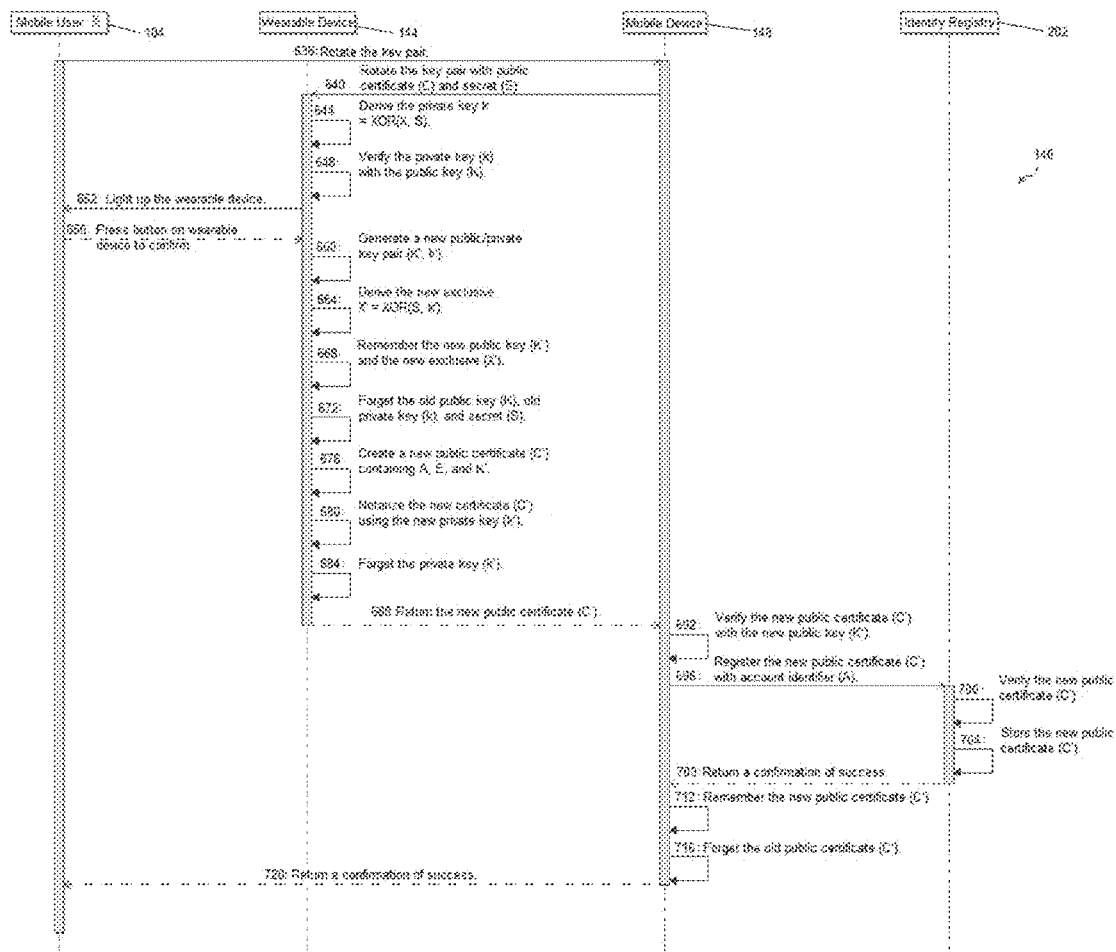
FIG. 10 is a sequence diagram that depicts rotating the private key and the public key of the system in accordance with embodiments of the invention.

FIG. 10 depicts a sequence for rotating 140 the private key k. While it is highly unlikely to calculate or derive the private key k from the public key K, the more times that the private key k has been cumulatively used, the greater the likelihood that the private key k could be derived from the public key K and compromise the security of the system. Therefore it is desirable to periodically rotate keys (replace old keys with new keys) to guard against this aspect of public key cryptography. To begin the key rotation 140, the mobile user 104 requests 636 that the mobile device 148 rotate the current key pair.

Next, the mobile device 148 sends 640 the public certificate C and the secret key S to the wearable device 144. The wearable device 144 regenerates 644 the private key k by taking the exclusive-or of the existing exclusive key X (stored on the wearable device 144) and the existing secret key S (supplied by the new mobile device 496) as k=XOR(X, S), and then the wearable device 144 verifies 648 the regenerated private key k using the public key K. The wearable device 144 turns on 652 a light, and the mobile user 104 authorizes 656 the key rotation by pressing a button on the wearable device 144 which turns off the light on the wearable device 144. The wearable device 144 generates 660 a new private key k' and corresponding public key K' that can be used to verify any notarizations done with the new private key k'. The wearable device 144 derives 664 a new exclusive key X'=XOR(S, k'). The wearable device 144 stores 668 the new public key K' and new exclusive key X' on a non-transitory computer-readable storage medium. Then, the wearable device 144 forgets or deletes 672 the old public key K, the old private key k, and the secret key S from a non-transitory computer-readable storage medium.

To complete the key rotation, a new public certificate C' must be created. The wearable device 144 generates 676 a new public certificate C' containing the account identifier A, the email address, and the new public key K'. The wearable device 144 notarizes 680 the new public certificate C' using the newly generated private key k' to create a notary seal containing a digital signature of the contents of the new public certificate C'. Then, the wearable device 144 forgets or deletes 684 the newly generated private key k' from a non-transitory computer-readable storage medium. The wearable device 144 returns 688 the new notarized public certificate C' to the mobile device 148, and the mobile device 148 verifies 692 the new notarized public certificate C' using the new public key K'. The mobile device 148 registers 696 the new public certificate C' for the account identifier A with the identity registry 202, which verifies 700 the new public certificate C' using the new public key K' and stores 704 the new public certificate C' on a non-transitory computer-readable storage medium. The identity registry 202 returns 708 a confirmation of success to the mobile device 148, and the mobile device 148 remembers or stores 712 the new public certificate C' on a non-transitory computer-readable storage medium. The mobile device 148 forgets or deletes 716 the old public certificate C from a non-transitory computer-readable storage medium. Then, the mobile device 148 returns 720 a confirmation of success to the mobile user 104 to complete the sequence.

Figure 11A:
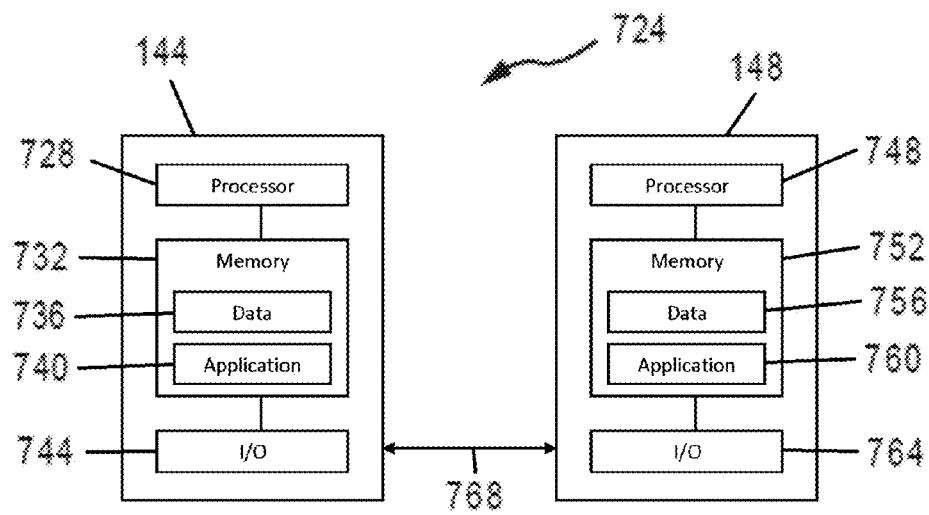
FIG. 11A is a block diagram of a system having a first device and a second device in accordance with embodiments of the invention.
Figure 11B:
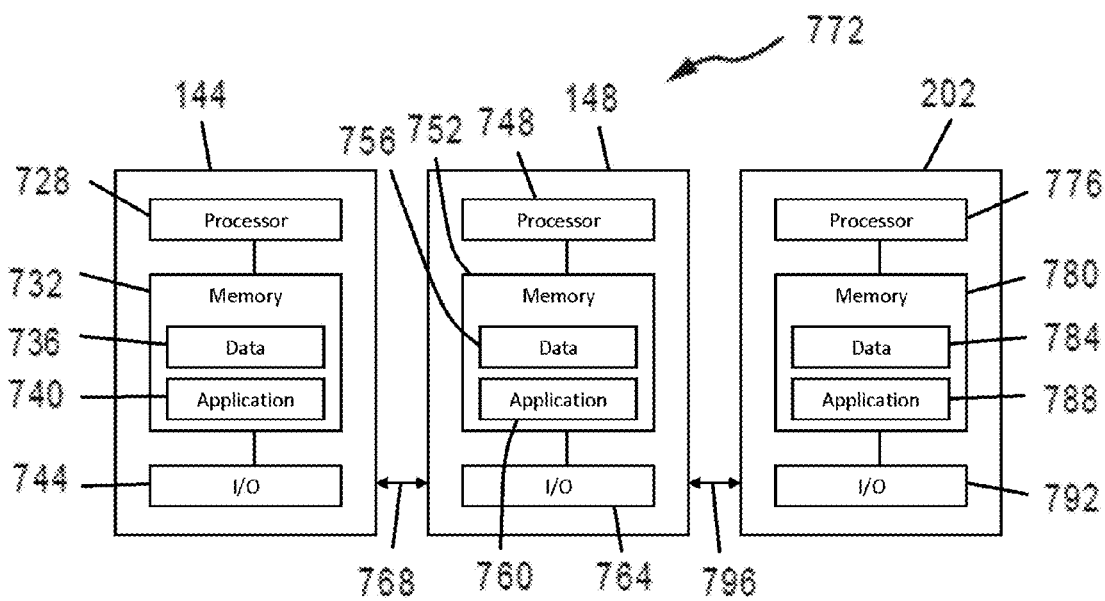
FIG. 11B is a block diagram of a system having first, second, and third devices in accordance with embodiments of the invention.

FIGS. 11A and 11B depict block diagrams of systems 724, 772 that implement the methods and processes described herein. The first system 724 comprises physically separate devices: a wearable device 144 and a mobile device 148. The wearable device 144 has a processor 728, memory 732 with data 736 and an application 740, and an input/output (I/O) port 744. The memory 732 can store data 736, for example, the exclusive key X described herein, and the memory 732 can also store an application 740 with instructions for manipulating data 736 and communicating with other components of the wearable device 144. The processor 728 is configured to execute instructions from the application 740 and the memory 732. Lastly, the I/O port 744 can transmit and receive information from outside of the wearable device 144 to complete the methods and processes described herein.

Similarly, the mobile device 148 also has a processor 748, memory 752 with data 756 and an application 760, and an I/O port 764. Further, the components of the mobile device 148 function like the components of the wearable device 148 with obvious exceptions, for example, the secret key S is data 756 stored on the memory 752 of the mobile device 148.

The devices 144, 148 of the first system 724 are physically separate, but the devices 144, 148 communicate with each other via their respective I/O Ports 744, 764 and a communication protocol 768. As described above, a secure communication protocol is desired between the devices 144, 148, and examples of the communication protocol 768 include, but are not limited to, Bluetooth 4 and near field communications (NFC) with transport layer security (TLS) 1.2 or greater.

Now referring to FIG. 11B, the second system 772 comprises a wearable device 144, a mobile device 148, and an identity registry 202. The wearable device 144 and the mobile device 148 have the same components as described above with respect to FIG. 11A, and similarly, the identity registry 202 has a processor 776, memory 780 with data 784 and an application 788, and an I/O port 792. The devices 144, 148 and the registry 202 are all physically separate, and the identity registry 202 is connected to one or both of the devices 144, 148 via the I/O port 792 and a communication protocol 796. In various embodiments, the communication protocols 768, 796 may be the same, and in some embodiments, the communication protocols 768, 796 may be distinct.

Accordingly, the invention has been described with some degree of particularity directed to the exemplary embodiments of the invention. It should be appreciated though that modifications or changes may be made to the exemplary embodiments of the present invention without departing from the inventive concepts contained herein.

As set forth below, the claims generally, but not exclusively, describe methods and systems for making public-private key cryptography more secure by splitting a private key k into two partial keys across two different electronic devices.

What is claimed is:

1. A method for regenerating a private key k, comprising:
providing a mobile device and a wearable device having a button, and pairing the mobile device and the wearable device via a wireless communication protocol;
applying a bit-wise exclusive-or function XOR to a hash of a password value and a hash of an identification value to generate a secret key S, wherein the hash of the password value and the hash of the identification value are each bit strings having the same predetermined length, and the secret key S is stored on the mobile device;
providing a private key k associated with a public key K, wherein the secret key S and the private key k are each bit strings having the same predetermined length;
applying a bit-wise exclusive-or function XOR to the secret key S and the private key k to generate an exclusive key X, wherein the exclusive key X is stored on the wearable device;
entering an input on the mobile device to transmit the secret key S from the mobile device to the wearable device; and
pressing the button on the wearable device to regenerate the private key k on the wearable device by applying a bit-wise exclusive-or function XOR to the secret key S from the mobile device and the exclusive key X from the wearable device.

2. The method of claim 1, further comprising:
applying a bit-wise exclusive-or function XOR to the secret key S and a new private key k' associated with a new public key K' to generate a new exclusive key X'.

3. The method of claim 2, further comprising:
applying a bit-wise exclusive-or function XOR to the secret key S and the new exclusive key X' to regenerate the new private key k'.

4. The method of claim 3, further comprising:
verifying the regenerated new private key k' using the associated public key K';
using the regenerated new private key k' to notarize (digitally sign) a bit string; and
deleting the regenerated private key k'.

5. The method of claim 4, wherein the notarized (digitally signed) bit string is one of data, a symmetric key, a document, and a message.

6. The method of claim 4, further comprising:
prompting, after verifying the regenerated new private key k', an owner of the regenerated new private key k' to approve the using step on the wearable device, wherein the using step is executed only if the owner responds to the prompt by pressing the button on the wearable device.

7. The method of claim 3, further comprising:
verifying the regenerated new private key k' using the associated public key K';
using the regenerated new private key k' to decrypt a bit string that was encrypted using the new public key K' that corresponds to the regenerated new private key k'; and
deleting the regenerated new private key k'.

8. The method of claim 7, wherein the encrypted bit string is one of data, a symmetric key, a document, and a message.

9. The method of claim 7, further comprising:
prompting, after verifying the regenerated new private key k', an owner of the regenerated new private key k' to approve the using step on the wearable device, wherein the using step is executed only if the owner responds to the prompt by pressing the button on the wearable device.

10. The method of claim 1, further comprising:
verifying the regenerated private key k using the associated public key K;
using the regenerated private key k to notarize (digitally sign) a bit string; and
deleting the regenerated private key k.

11. The method of claim 3, wherein the notarized (digitally signed) bit string is one of data, a symmetric key, a document, and a message.

12. The method of claim 10, further comprising:
prompting, after verifying the regenerated private key k, an owner of the regenerated private key k to approve the using step on the wearable device, wherein the using step is executed only if the owner responds to the prompt by pressing the button on the wearable device.

13. The method of claim 1, further comprising:
verifying the regenerated private key k using the associated public key K;
using the regenerated private key k to decrypt a bit string that was encrypted using the public key K that corresponds to the regenerated private key k; and
deleting the regenerated private key k.

14. The method of claim 13, further comprising:
prompting, after verifying the regenerated private key k, an owner of the regenerated private key k to approve the using step on the wearable device, wherein the using step is executed only if the owner responds to the prompt by pressing the button on the wearable device.

15. The method of claim 13, wherein the encrypted bit string is one of data, a symmetric key, a document, and a message.

16. The method of claim 1, further comprising:
storing the secret key S in a non-transitory computer-readable storage medium on the mobile device; and
storing the exclusive key X in a non-transitory computer-readable storage medium on the wearable device.

17. The method of claim 16, wherein the wearable device is a human implantable device.

18. The method of claim 1, further comprising:
storing the secret key S in a non-transitory computer-readable storage medium on a laptop computer; and
storing the exclusive key X in a non-transitory computer-readable storage medium on the wearable device.

19. The method of claim 18, wherein the wearable device is a human implantable device.

20. The method of claim 1, wherein the bit-wise exclusive-or function XOR is part of an advanced encryption standard, a blowfish cipher, a triple DES cipher, and a XOR cipher.

21. The method of claim 1, wherein pressing the button causes the wearable device to at least one of (i) notarize a bit string, (ii) encrypt a bit string, and (iii) decrypt a bit string using the regenerated private key k.

22. The method of claim 1, further comprising:
regenerating the secret key S in another instance by applying a bit-wise exclusive-or function XOR to the hash of the password value and the identification value.

23. A system for regenerating a private key k, comprising:
a mobile device having a touchscreen and a non-transitory computer-readable storage medium that is configured to process:
  a secret key S that is a bit-wise exclusive-or function XOR of a hash of a password value and a hash of an identification value, wherein the hash of the password value and the hash of the identification value are each bit strings having the same predetermined length;
a wearable device that is paired with the mobile device via a wireless communication protocol, the wearable device having a button and a non-transitory computer-readable storage medium that is configured to process:
  a private key k in a first instance and a public key K that verifies the private key k, the private key k is a bit string having the same predetermined length as the secret key S;
  an exclusive key X that is a bit-wise exclusive-or function XOR of secret key S provided by the mobile device, upon receiving an input on the touchscreen of the mobile device, and the private key k; and
  a regenerated private key k in a second instance, upon pressing the button of the wearable device, that is a bit-wise exclusive-or function XOR of the exclusive key X provided by the wearable device and the secret key S provided by the mobile device.

24. A method for notarizing a message M using a regenerated private key k, comprising:
providing a mobile device and a wearable device having a button, wherein a secret key S is stored on the mobile device and an exclusive key X is stored on the wearable device, wherein the exclusive key X is the result of a bit-wise exclusive-or function XOR to a private key k and the secret key S, the keys are bit strings having the same predetermined length, and a public key K is associated with the private key k;
pairing the mobile device and the wearable device via a wireless communication protocol;
prompting the mobile device to transmit the secret key S and a message M from the mobile device to the wearable device;
regenerating the private key k on the wearable device by applying a bit-wise exclusive-or function XOR to the secret key S from the mobile device and the exclusive key X from the wearable device;
pressing the button on the wearable device to:
  (i) notarize the message M on the wearable device using the regenerated private key k to create a notary seal N;
  (ii) delete the regenerated private key k on the wearable device;
  (iii) transmit the notary seal N from the wearable device to the mobile device; and
verifying that the notary seal N corresponds to the message M using the public key K on the mobile device.

25. The method of claim 24, wherein the prompting step comprises entering an input on a touchscreen of the mobile device.

26. The method of claim 24, wherein the secret key S is the bit-wise exclusive-or function XOR of a hash of a password value and a hash of an identification value, wherein the hash of the password value and the hash of the identification value are each bit strings having the same predetermined length.

* * * * *